(12) United States Patent
Hiroi et al.

(10) Patent No.: US 10,267,348 B2
(45) Date of Patent: Apr. 23, 2019

(54) BOLT FOR PEELING COATING FILM

(71) Applicant: AOYAMA SEISAKUSHO CO., LTD., Niwa-Gun (JP)

(72) Inventors: Yuichi Hiroi, Niwa-Gun (JP); Masashi Okamoto, Niwa-Gun (JP); Tomoyuki Fukuchi, Niwa-Gun (JP); Yukinori Fujimoto, Niwa-Gun (JP)

(73) Assignee: Aoyama Seisakusho Co., Ltd., Niwa-Gun (JP)

( * ) Notice: Subject to any disclaimer, the term of this patent is extended or adjusted under 35 U.S.C. 154(b) by 33 days.

(21) Appl. No.: 15/493,204

(22) Filed: Apr. 21, 2017

(65) Prior Publication Data
US 2017/0219001 A1 Aug. 3, 2017

Related U.S. Application Data

(63) Continuation of application No. PCT/JP2016/072501, filed on Aug. 1, 2016.

(30) Foreign Application Priority Data

Aug. 4, 2015 (JP) .................................. 2015-153867

(51) Int. Cl.
*F16B 35/00* (2006.01)
*F16B 33/02* (2006.01)

(52) U.S. Cl.
CPC ............ *F16B 35/007* (2013.01); *F16B 33/02* (2013.01); *F16B 35/00* (2013.01)

(58) Field of Classification Search
CPC .. F16B 25/00; F16B 25/0015; F16B 25/0052; F16B 33/02; F16B 35/00; F16B 35/007
(Continued)

(56) References Cited

U.S. PATENT DOCUMENTS 3,530,760 A * 9/1970 Lindstrand .......... F16B 25/0047
411/416
4,973,209 A * 11/1990 Essom .................... F16B 33/02
411/308
(Continued)

FOREIGN PATENT DOCUMENTS

JP 06-313418 A1 11/1994
JP 07-332337 A1 12/1995
(Continued)

OTHER PUBLICATIONS

International Search Report and Written Opinion (Application No. PCT/JP2016/072501) dated Sep. 6, 2016.
(Continued)

*Primary Examiner* — Roberta S Delisle
(74) *Attorney, Agent, or Firm* — Burr & Brown, PLLC

(57) ABSTRACT

A bolt for peeling a coating film of the present invention includes notch parts for peeling a coating film, the notch parts being formed over a plurality of pitches at top parts of screw threads in a male screw part formed in a shaft part. The bolt is characterized in that the respective notch parts formed over the plurality of pitches are arranged to be greatly inclined at an angle of 40° to 50° to an axial line of the shaft part. Since the respective notch parts can be rolled sequentially, it is possible to form the notch parts to be deeper and sharper than conventional ones and to enhance the coating film peeling performance. Also, the coating film peeled can be discharged efficiently as compared with conventional cases.

6 Claims, 4 Drawing Sheets

(58) Field of Classification Search
USPC .................................................. 411/311, 411
See application file for complete search history.

(56) References Cited

U.S. PATENT DOCUMENTS

| | | | | |
|---|---|---|---|---|
| 5,000,638 | A * | 3/1991 | Essom | .................... F16B 33/02 411/386 |
| 5,110,245 | A * | 5/1992 | Hiroyuki | ............. F16B 25/0015 411/417 |
| 6,086,303 | A * | 7/2000 | Fluckiger | ............. F16B 5/0275 411/399 |
| 6,347,917 | B1 * | 2/2002 | Kato | ........................ B21K 1/56 411/308 |
| 6,976,818 | B2 * | 12/2005 | Levey | .................... F16B 33/02 411/310 |
| 7,862,280 | B2 * | 1/2011 | Su | ....................... F16B 25/0015 411/387.8 |
| 8,864,430 | B2 * | 10/2014 | Su | ....................... F16B 25/0015 411/386 |
| 2003/0072635 | A1 | 4/2003 | Kato | |
| 2003/0185649 | A1 | 10/2003 | Mizuno et al. | |
| 2007/0297873 | A1 * | 12/2007 | Wieser | ................. F16B 1/0071 411/411 |
| 2008/0145182 | A1 * | 6/2008 | Gstach | .................... F16B 25/00 411/403 |
| 2009/0274535 | A1 | 11/2009 | Mair | |
| 2010/0172718 | A1 | 7/2010 | Gong et al. | |
| 2010/0247267 | A1 * | 9/2010 | Bianchi | .................... F16B 25/00 411/387.4 |
| 2012/0097286 | A1 | 4/2012 | Herre et al. | |
| 2015/0204370 | A1 | 7/2015 | Serizawa | |

FOREIGN PATENT DOCUMENTS

| | | |
|---|---|---|
| JP | H09-189319 A1 | 7/1997 |
| JP | 11-022713 A1 | 1/1999 |
| JP | 11-051026 A1 | 2/1999 |
| JP | 3283336 B2 | 5/2002 |
| JP | 2003-120632 A1 | 4/2003 |
| JP | 2003-278729 A1 | 10/2003 |
| JP | 2004-044767 A1 | 2/2004 |
| JP | 2012-526246 A1 | 10/2012 |
| JP | 2015-137700 A1 | 7/2015 |

OTHER PUBLICATIONS

Extended European Search Report (Application No. 16832986.0) dated May 3, 2018.

* cited by examiner

Driving direction

BOLT FOR PEELING COATING FILM

TECHNICAL FIELD

The present invention relates to a bolt for peeling a coating film, which can be fastened while peeling a coating film adhered to a threaded hole.

BACKGROUND ART

For example, in an assembling line for automobiles, a part of a coating material used for coating a body is adhered even to nuts and tap holes of accompanying exterior parts (especially, undercarriages, floor panels, etc.) in some cases. Normally, masking is preliminarily applied to nuts and threaded holes such as tap holes provided in members to be coated in order to prevent the coating material from entering there. The operation of attaching/detaching the masking material in the assembling line, however, is complicated. In addition, this operation can be a major factor for deterioration in assembling operation efficiency and increase in cost, especially in the case of members such as large panels having a number of threaded holes to be masked.

Thus, there have conventionally been proposed techniques which, even without masking or coating film removal, enable direct fastening of a bolt to a threaded hole to which a coating film is adhered. For example, Patent Literatures 1 and 2 disclose bolts for peeling a coating film, including notch parts for peeling a coating film, the notch parts being formed over a plurality of pitches at top parts of screw threads in a male screw part formed in a shaft part. These bolts for peeling a coating film can be fastened while peeling a coating film adhered to the internal surface of a threaded hole by means of the notch parts.

In the conventional bolts for peeling a coating film, however, the notch parts for peeling a coating film are commonly arranged in parallel with an axial line of the shaft part as shown in FIG. 1 of Patent Literature 1 and FIG. 1 of Patent Literature 2. Also in the case where the notch parts are arranged to be inclined to the axial line of the shaft part, the inclination angle is small, i.e., around 10°.

One industrial manufacturing method for a bolt is a rolling method including holding a columnar material, which is referred to as a blank, between a pair of dies and rotating the blank while moving these dies in mutually opposite directions for threading. When a bolt for peeling a coating film in which notch parts are arranged in parallel with an axial line is rolled as described above, screw rolling is performed using dies including a plurality of protrusions formed to form notch parts at the same positions. Then, forming resistance greater than that applied to a portion which is merely threaded without any protrusion acts impulsively at the moment when the blank has reached the position of these protrusions. Especially when many protrusions are aligned on the axial line to form a number of notch parts, this tendency becomes strong. As a result of this, outward force acts on the dies at the moment when the notch parts are formed, and thus deep notch parts are disadvantageously difficult to form.

In addition, there is also a method for rolling a screw including preliminarily forming a vertical groove in a blank and applying normal dies to this blank. This method enables forming of deep notch parts. However, since the edges of the vertical groove are crushed at the time of rolling, it is difficult to form notch parts having a sharp sectional shape. Therefore, the bolts for peeling a coating film in which the notch parts are arranged in parallel with the axial line involve the problem that deep and sharp notch parts cannot be rolled. Although deep and sharp notch parts have excellent coating film peeling effect, shallow and non-sharp notch parts cannot sufficiently peel the coating film.

Also, the conventional bolts for peeling a coating film involve the problem that the coating film peeled by the edges of the notch parts remains within the notch parts in a compacted state, and is hard to discharge to the tip end side of the bolts. When the notch parts are clogged by the coating film, the torque resistance at the time of fastening the bolts increases, whereby sufficient fastening force cannot be obtained.

CITATIONS LIST

Patent Literature 1: JP 1995-332337 A
Patent Literature 2: JP 2015-137700 A

SUMMARY OF INVENTION

Technical Problems

Accordingly, an object of the present invention is to provide a bolt for peeling a coating film which, in order to solve the conventional problems described above, includes deep and sharp notch parts formed by a rolling method and has excellent coating film peeling performance and coating film discharging performance.

SOLUTIONS TO PROBLEMS

The present invention made to solve the above-mentioned problems is a bolt for peeling a coating film which includes notch parts for peeling a coating film, the notch parts being formed over a plurality of pitches at top parts of screw threads in a male screw part formed in a shaft part, wherein the respective notch parts formed over the plurality of pitches are arranged to be inclined at an angle of 40° to 50° to an axial line of the shaft part.

The notch parts preferably have a gentle slope on a leading side in a driving direction and a steep slope on a trailing side in the driving direction.

Also, the bolt can take a form such that the male screw part has a normal screw part formed on the base end side of the shaft part and a non-normal screw part formed on the tip end side relative to the normal screw part; that the non-normal screw part is formed to have a root diameter deeper than that of the normal screw part and a flank angle steeper than that of the normal screw part; and that the notch parts are formed in the non-normal screw part.

In this form, the notch parts can be formed to have a depth shallower than the valley of the non-normal screw part. Also, the non-normal screw part can be formed to have a following flank angle steeper than a leading flank angle. Further, the leading flank slope of the non-normal screw part can be formed in an irregular shape such that it is bent at the top part of the screw thread.

ADVANTAGEOUS EFFECTS OF INVENTION

In the bolt for peeling a coating film according to the present invention, the respective notch parts formed over the plurality of pitches at the top parts of the screw threads in the male screw part are arranged to be inclined at an angle of 40° to 50° to the axial line of the shaft part. Thus, it is possible to sequentially roll the respective notch parts formed over the plurality of pitches when the bolt for peeling a coating film is manufactured by the rolling method. Therefore, notch parts which are deeper and sharper than those of the conventional bolts for peeling a coating film can be formed, and the coating film peeling performance can be enhanced.

Also, in the bolt for peeling a coating film according to the present invention, the respective notch parts formed over the plurality of pitches are arranged so that the edges of the notch parts are inclined at an angle of 40° to 50°. Thus, upon rotation of the bolt, it is possible to push out the coating film peeled to the tip end side of the bolt along this slope. Therefore, the bolt can efficiently discharge the coating film peeled as compared with the conventional bolts for peeling a coating film in which the notch parts are arranged in parallel with the axial line.

DETAILED DESCRIPTION OF THE INVENTION (First Embodiment)

Figure 1:
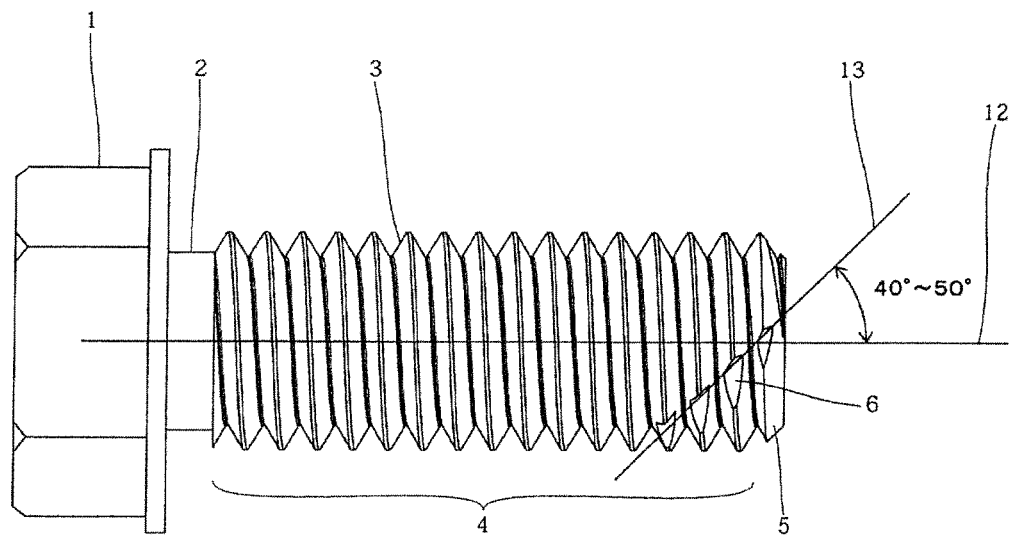
FIG. 1 is a front view showing a bolt for peeling a coating film according to a first embodiment.

FIG. 1 is a front view showing a bolt for peeling a coating film according to a first embodiment of the present invention. The bolt for peeling a coating film of the present invention is used to be fastened, for example, to weld nuts, floating nuts, case nuts, and threaded holes tapped directly to members which have undergone the coating step.

The bolt shown in FIG. 1 includes a head part 1 and a shaft part 2, and the shaft part 2 has a male screw part 3. The male screw part 3 is composed of a normal screw part 4 having a screw thread angle (included angle) of 60°, but an incomplete screw part 5 having a reduced screw thread diameter is formed at the tip end of the shaft part 2.

Notch parts 6 are formed over a plurality of pitches at the tip end part of the male screw part 3. The respective notch parts 6 are formed by recessing top parts of screw threads formed in the male screw part 3, and also formed by protrusions formed in rolling dies as described above. As shown in an enlarged manner in FIG. 2, the respective notch parts 6 have a shape such that they are narrow in width on a leading side in a driving direction of the bolt and are broad in width on a trailing side in the driving direction. Also, the respective notch parts 6 are formed to be shallow on the leading side and to be deeper toward the trailing side as shown in the sectional view in FIG. 3. The notch parts 6 are preferably formed to have a depth equal to that of the screw thread or shallower than the depth of the valley of the screw.

The respective notch parts 6 have a gentle slope 7 formed on the leading side and a steep slope 9 formed on the trailing side with a root line 8 lying between the steep slope 9 itself and the gentle slope 7. A portion where this steep slope 9 intersects the screw thread forms a sharp edge 10. In this embodiment, the angle between the gentle slope 7 and the radial line 11 is 70°, and the angle between the steep slope 9 and the radial line 11 is 30°, as shown in the sectional view in FIG. 3.

Figure 2:
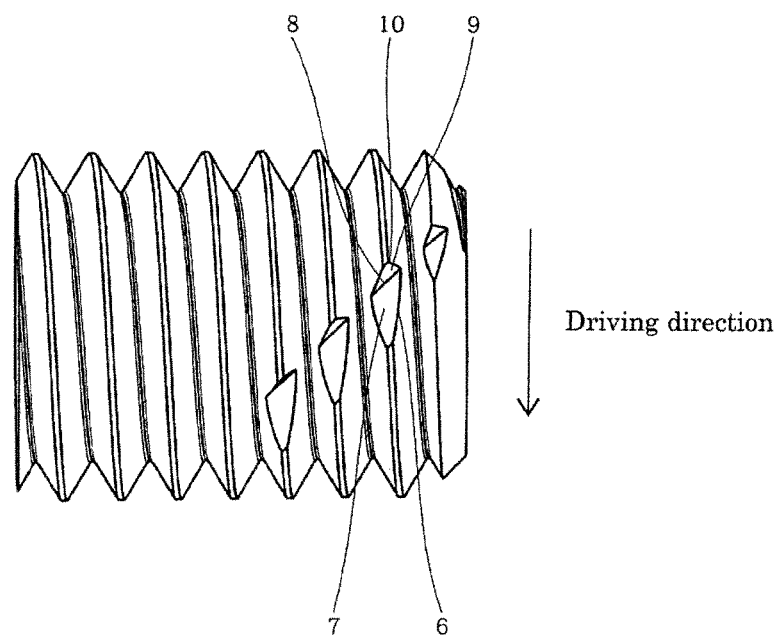
FIG. 2 is an enlarged view of an essential part in FIG. 1.

Also, the root line 8 is inclined at an angle of 40° to 50° to an axial line 12 of the shaft part 2 of the bolt, and, besides, the root line 8 of each of the notch parts 6 lies on the same line shown as a line 13 in FIG. 2. This line 13 is inclined so that the tip end side of the shaft part 2 is directed to a direction opposite to the driving direction. Thus, the respective notch parts 6 formed over the plurality of pitches are arranged to be inclined at an angle of 40° to 50° to the axial line 12 of the shaft part 2. Also, the steep slope 9 of each of the notch parts 6 is inclined in the above-mentioned direction at an angle of 40° to 50° to the axial line 12.

Figure 3:
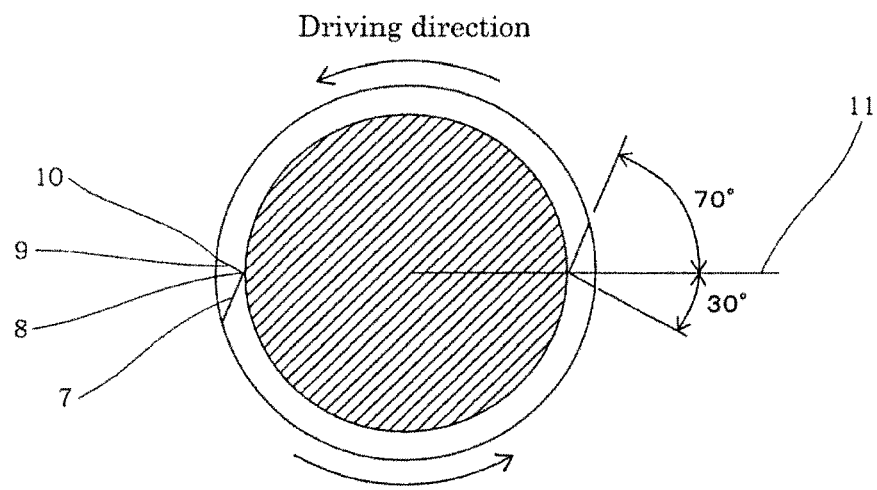
FIG. 3 is a sectional view of the essential part in FIG. 1 in a vertical direction to the axial line.

As shown in FIGS. 1 and 2, the notch parts 6 are formed at the tip end parts in the male screw part 3 and, in this embodiment, are formed over 4 pitches including the incomplete screw part 5. Thus, when the notch parts 6 are formed at the tip end parts in the male screw part 3, it is possible to smoothly screw the bolt while peeling the coating film adhered to the internal surface of the threaded hole by means of the edge 10 of each of the notch parts 6 at the tip end parts. Since the notch part 6 in a portion distant from the tip end of the shaft part 2 involves reduced necessity to peel the coating film, the number of pitches is sufficiently about 2 to 5. Incidentally, these notch parts 6 are formed also at an opposite position across the axial line 12, as shown in FIG. 3.

The bolt for peeling a coating film having such a structure is similar to the conventional bolts for peeling a coating film in that it is screwed into the threaded hole while peeling the coating film adhered to the internal surface of the threaded hole by means of the edge 10 of each of the notch parts 6. However, the respective notch parts 6 are arranged to be greatly inclined at an angle of 40° to 50° to the axial line 12 of the shaft part 2, and thus it is possible to arrange the protrusions formed on the rolling dies to be sequentially displaced in a direction orthogonal to the axial line to roll the notch parts 6 sequentially. Therefore, the respective notch parts 6 can be formed so that they are deeper than conventional ones and that the edge 10 is sharper than a conventional one. As a result of this, the bolt can exhibit enhanced coating film peeling performance as compared with the conventional bolts for peeling a coating film in which the notch parts are arranged in parallel with the axial line.

Also, the notch parts 6 which are deeper than conventional ones effectively function as a space for housing the coating film peeled, and, besides, the coating film peeled is pushed into the tip end side of the shaft part 2 by the steep slope 9. Therefore, the coating film peeled can be smoothly discharged as compared with the case of the conventional bolts for peeling a coating film in which the notch parts are arranged in parallel with the axial line. Since the coating film discharged from one of the notch parts 6 which is on a side distant from the tip end of the shaft part 2 is fed to the tip end side of the bolt by another of the notch parts 6 which is adjacent to the one of the notch parts 6, the coating film can be discharged more efficiently.

An inclination angle of the respective notch parts 6, which is preferable for attaining the above advantageous effect, ranges from 40° to 50°. In the case of an inclination angle smaller than this, the bolt is close to the conventional products and cannot provide any sufficient effect. Conversely, in the case of a larger inclination angle, the effect of feeding the coating film peeled to the adjacent notch part 6 is reduced. In this embodiment, the inclination angle of the notch parts 6 is set at the most preferable angle 45°.

(Second Embodiment)

The notch parts 6 are formed in the normal screw part 4 in the male screw part 3 in the first embodiment, but are formed in a non-normal screw part in a second embodiment which will be explained below.

Figure 4:
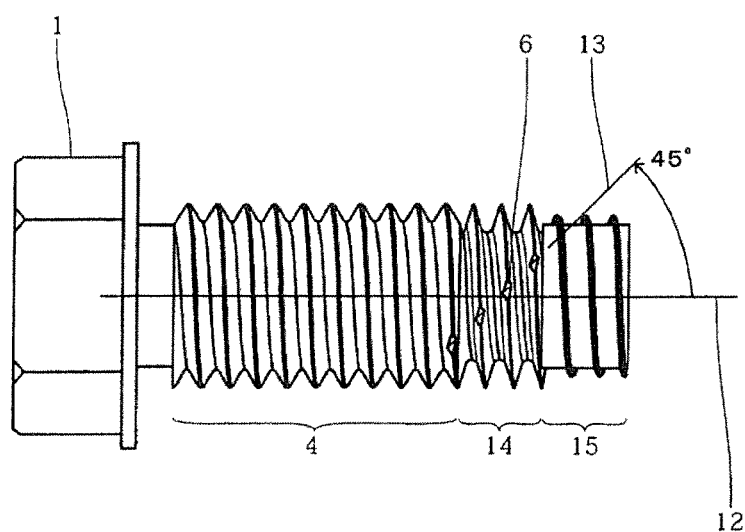
FIG. 4 is a front view showing a bolt for peeling a coating film according to a second embodiment.

As shown in FIG. 4, in the bolt of the second embodiment, the male screw part 3 has a normal screw part 4 formed on the base end side of a shaft part and a non-normal screw part 14 formed on the tip end side relative to the normal screw part 3. Further, a guide screw part 15 is provided at the forefront side of the shaft part.

Figure 5:
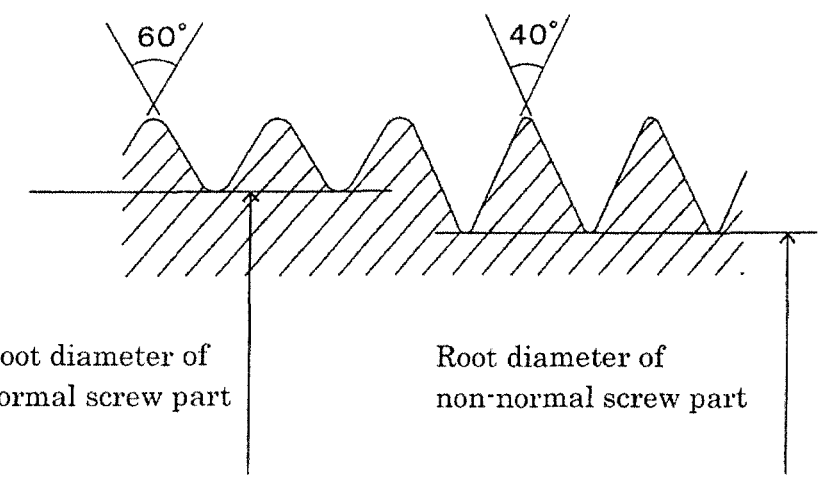
FIG. 5 is a sectional view showing a screw thread shape of the second embodiment in an enlarged manner.

As shown in FIG. 5, the normal screw part 4 and the non-normal screw part 14 have the same screw thread outer diameter, but the non-normal screw part 14 is formed to have a root diameter deeper than that of the normal screw part 4. Also, the non-normal screw part 14 is formed to have a screw thread angle (angle obtained by adding the leading flank angle of the screw thread and the following flank angle of the screw thread) smaller than that of the normal screw part 4. For example, when the normal screw part 4 has a screw thread angle of 60°, the screw thread angle of the non-normal screw part 14 can be defined as 30° to 50°, preferably 40°. In brief, the non-normal screw part 14 is formed to have a flank angle steeper than that of the normal screw part 4.

This non-normal screw part 14 has notch parts 6, which are similar to those of the first embodiment, formed over a plurality of pitches.

By virtue of the bolt for peeling a coating film of this second embodiment, the coating film adhered to the inside of the threaded hole can be sufficiently peeled. Also, the non-normal screw part 14 passes through the threaded hole, whereby the coating material stored in the notch parts 6 can be discharged to the outside.

Especially, the space for storing the coating film, which is formed between the male screw of the non-normal screw part 14 and the female screw of the threaded hole, can be enlarged by making the root diameter of the non-normal screw part 14 deeper than that of the normal screw part 4 and making the screw thread angle of the non-normal screw part 14 smaller than that of the normal screw part 4.

Accordingly, the coating material remaining in the threaded hole can be reduced as soon as possible, and the increase in torque resistance during fastening can be suppressed. Also, the notch parts 6 are formed in a part of the normal screw part 4, thereby making it possible to store the residual coating film also in the notch parts 6 in the normal screw part 4 even when the coating material remains in the threaded hole and to prevent the occurrence of adverse effects such as increase in fastening torque resistance.

(Third Embodiment)

Figure 6:
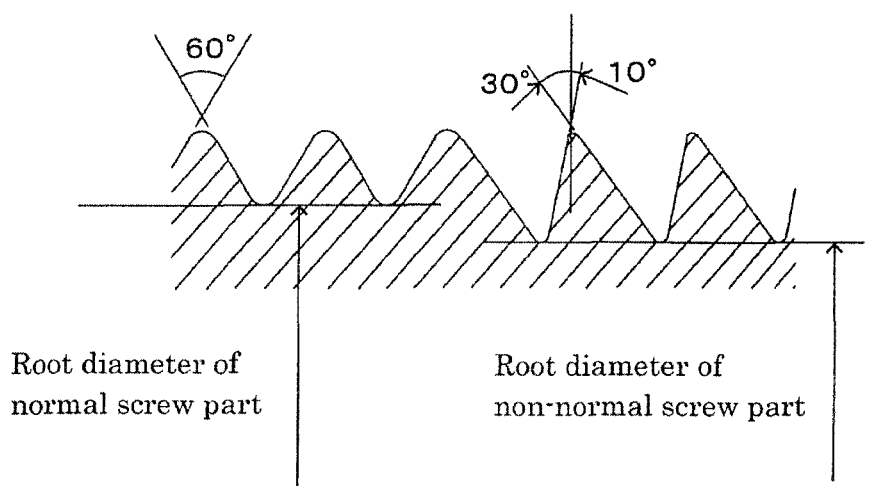
FIG. 6 is a sectional view showing a screw thread shape of a third embodiment in an enlarged manner.

FIG. 6 is a sectional view showing a screw thread shape of a third embodiment in an enlarged manner. When the flank angle of the non-normal screw part 14 in which the notch parts 6 are formed is made steep to enlarge a clearance formed with the female screw, just like the second embodiment, an advantage that the coating film peeled is easily discharged is obtained. However, there are concerns about increase in fastening torque resistance due to oblique insertion of the bolt since a clearance is formed between the leading flank of the male screw and the valley of the female screw.

Thus, the bolt of the third embodiment has been configured so that, in order to improve the oblique insertion performance of the bolt, the non-normal screw part 14 is formed to have a following flank angle steeper than a leading flank angle, thereby making the screw thread shape asymmetry as shown in FIG. 6. For example, when the normal screw part 4 has a screw thread angle of 60°, the following flank angle of the non-normal screw part 14 can be defined as 10°, and the leading flank angle can be defined as 30°.

(Fourth Embodiment)

Figure 7:
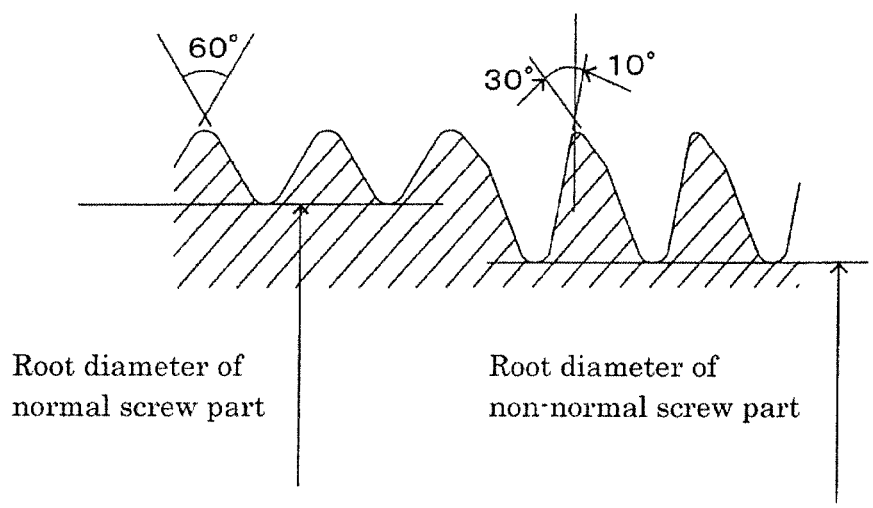
FIG. 7 is a sectional view showing a screw thread shape of a fourth embodiment in an enlarged manner.

FIG. 7 is a sectional view showing a screw thread shape of a fourth embodiment in an enlarged manner. In the bolt of the fourth embodiment, the non-normal screw part 14 is formed to have a steep following flank angle, and the leading flank slope is formed in an irregular shape such that it is bent at the top part of the screw thread, as shown in FIG. 7. Such an irregular screw thread can allocate a part of the volume of the following flank to the leading flank of the adjacent screw thread, so that the valley between the mutually adjacent screw threads (root diameter of the non-normal screw part 14) can be made deeper.

The bolt of the fourth embodiment has been configured so that the following flank angle of the non-normal screw part 14 is steeper and that the leading flank slope has an irregular shape such that it is bent at the top part of the screw thread, and thus can secure the volume for storing and feeding the coating. Along with this, the angle of the top part of the leading flank is increased, thereby making it possible to improve also the oblique insertion performance of the bolt.

REFERENCE SIGNS LIST

1: Head part
2: Shaft part
3: Male screw part
4: Normal screw part
5: Incomplete screw part
6: Notch part
7: Gentle slope
8: Root line
9: Steep slope
10: Edge
11: Radial line
12: Axial line
13: Line
14: Non-normal screw part
15: Guide screw part

The invention claimed is:

1. A bolt for peeling a coating film, the bolt comprising a shaft part, which has an axial center line, and notch parts for peeling the coating film, the notch parts being formed over a plurality of pitches at top parts of screw threads in a male screw part formed in the shaft part, with each notch part comprising a gentle slope having a shape that has a narrow extending width and a steep slope having a shape that has a broad extending width such that the gentle slope and the steep slope are connected at their respective widest widths so as to have a root line lying therebetween, wherein the root line in the respective notch parts formed over the plurality of pitches are arranged to be inclined at an angle of 40° to 50° from the axial center line of the shaft part.

2. The bolt for peeling a coating film according to claim 1, wherein the notch parts have the gentle slope on a leading side in a driving direction and the steep slope on a trailing side in the driving direction.

3. The bolt for peeling a coating film according to claim 1, wherein the male screw part has a normal screw part formed on the base end side of the shaft part and a non-normal screw part framed on the tip end side relative to the normal screw part; the non-normal screw part is formed to have a root diameter deeper than that of the normal screw part and a flank angle steeper than that of the normal screw part; and the notch parts are formed in the non-normal screw part.

4. The bolt for peeling a coating film according to claim 3, wherein the notch parts are formed to have a depth shallower than the valley of the non-normal screw part.

5. The bolt for peeling a coating film according to claim 3, wherein the non-normal screw part is formed to have a following flank angle steeper than a leading flank angle.

6. The bolt for peeling a coating film according to claim 3, wherein the leading flank slope of the non-normal screw part is formed in an irregular shape such that it is bent at the top part of the screw thread.

\* \* \* \* \*